United States Patent [19]

Barlet-Gouedard et al.

[11] Patent Number: 5,503,672

[45] Date of Patent: Apr. 2, 1996

[54] HIGH TEMPERATURE RETARDERS FOR OIL FIELD CEMENTS, CEMENT SLURRIES AND CORRESPONDING CEMENTING PROCESSES

[75] Inventors: Véronique Barlet-Gouedard, Sceaux; Hugo Hendriks, Saint-Etienne; Pierre Maroy, Saint-Galmier, all of France

[73] Assignee: Dowell, a division of Schlumberger Technology Corporation, Houston, Tex.

[21] Appl. No.: 207,986

[22] Filed: Mar. 8, 1994

[30] Foreign Application Priority Data

Mar. 10, 1993 [FR] France .................................. 93 02833

[51] Int. Cl.$^6$ .................................................. C04B 22/16
[52] U.S. Cl. ........................... 106/819; 106/717; 106/719; 106/724; 106/810; 106/806; 106/815; 106/823
[58] Field of Search ...................... 106/717, 719, 106/724, 810, 815, 823, 819, 806; 405/266; 166/293, 294

[56] References Cited

U.S. PATENT DOCUMENTS

| 3,748,159 | 7/1973 | George | 106/717 |
| 3,753,748 | 8/1973 | Martin | 106/717 |
| 4,131,578 | 12/1978 | Crinkelmeyer et al. | 106/717 |
| 4,468,252 | 8/1984 | Crump et al. | 106/717 |
| 4,941,536 | 7/1990 | Brothers et al. | 166/293 |

FOREIGN PATENT DOCUMENTS

| 177308 | 4/1986 | European Pat. Off. |
| 2157279 | 10/1985 | United Kingdom. |

*Primary Examiner*—Mark L. Bell
*Assistant Examiner*—Michael Marcheschi
*Attorney, Agent, or Firm*—John E. Vick, Jr.

[57] ABSTRACT

The invention relates to the cementing of high temperature wells. The retarder consists of a methylene phosphonic acid derivative and of a boric acid or a borate at least as acid as borax in an aqueous solution, in particular, Na pentaborate, in a preferred ratio of 0.08 to 0.92 parts by weight. A long setting time and a very swift compressive strength development are obtained at the same time.

7 Claims, No Drawings

HIGH TEMPERATURE RETARDERS FOR OIL FIELD CEMENTS, CEMENT SLURRIES AND CORRESPONDING CEMENTING PROCESSES

The invention relates to the technical sector concerned with the cementing of the annuluses of oil, gas, water, geothermal and analogous wells.

The skilled artisan is familiar with the need, after a well has been drilled, to inject a cement slurry into the annulus located between the tubing and the underground formations, both to consolidate the well and to insulate the different zones.

The process consists in injecting the slurry into the tubing right down to the bottomhole, and then in causing it to rise up through the annulus, where it is allowed to set. The general process is well known, and there is no need to explain it in detail here.

We are also familiar with the difficulties experienced by the operator, particularly on account of the temperature cycle undergone by the cement slurry.

This problem is particularly acute in the case of wells in which the slurry will be subjected to high temperatures.

In this case, it is particularly difficult to reconcile two vital requirements, one being to retard the setting of the cement sufficiently (and despite the fact that the slurry goes through a high temperature stage) for setting actually to take place in the annulus, and the other requirement being not to prolong unduly, through the effect of the necessary retarder, the time that the cement slurry, and in particular that portion of it which is located towards the top of the well, that is to say at a fairly low temperature, will take to set to a sufficient degree.

In the case of deep wells, that is to say one of the examples of high temperature wells, the problem is aggravated by the fact that the slurry pumping time is longer.

The solutions proposed in the prior art are either inadequate or very imperfect, or unsatisfactory.

According to U.S. Pat. Nos. 4,941,536 and 5,049,288, a borate is mixed with a water soluble copolymer. In the examples given, these patents do not make it possible to obtain both a long thickening time (TT), that is to say of more than 7 hours at the bottom hole circulation temperature (BHCT), and swift compressive strength development for the cement after its placement for temperature below the BHCT, the criterion in this connection being that of attaining 35 kg/cm2 (500 psi) in less than 24 hours at a temperature 30° F. below the BHCT (or approximately BHCT less 17° C.).

It is also known to use organophosphates for their deflocculating and sequestering properties (U.S. Pat. Nos. 3,346, 488 and 5,089,150), as well as their stability, and to use them as dispersants (American patent application Ser. No. 487 469 of Feb. 3, 1990) or setting retarders (Ser. No. 665 248 and GB 84-09517).

Furthermore, the habitual retarders lead to a far longer setting time under static conditions than under dynamic conditions. Quite surprisingly, this does not apply to the additive according to the invention.

In U.S. patent application Ser. No. 655 248, it is essential to add a set activating agent in order to obtain appropriate development of the gel structure, to prevent sedimentation and free water phenomenon. This activating agent is a CMC or HECMC (well known cellulose derivatives), or an AMPS.

Document GB 84-09517 (GB 2 157 279 Nelson) does not suggest simultaneous achievement of the two aforementioned conflicting properties either. In this respect, example 5 does not specify the value to which "sufficient strength" corresponds. This document describes certain associations of phosphonic derivatives and borax (examples 4 and 5) over a wide range of proportions.

In these associations, borax plays the part of a retarder aid and is not the active retarding agent.

U.S. Pat. No. 3,748,159 describes a lignosulphonic acid salt and a pentaborate for forming high temperature cement slurries.

The pentaborates are chosen from among alkaline, alkaline-earth and ammonium pentaborates, in a ratio of approximately 1 to 4 parts by weight of lignosulphonate per part by weight of borate. The compositions described also comprise borax as an aid retarder. This document does not mention very long setting times with, at the same time, swift compressive strength development. In addition, a very strong retarder concentration is required at high temperatures in order to retard setting sufficiently. Such a concentration is financially prohibitive.

Furthermore, too much phosphonate is prejudical to compressive strength development.

U.S. Pat. Nos. 3,748,159 and 4,997,487, as well as document SPE/IADC 21976, will also be cited.

The present invention makes it possible, for the first time, to obtain simultaneously a very long setting time and very swift compressive strength development as soon as the cement slurry is placed in the annulus and pumping has stopped.

According to the invention, there is proposed a combination having a retarding effect for oil field cement slurries and analogous substances, consisting of a methylene-phosphonic acid derivative and a borate, the characteristic of which is that it has to be at least as acid or more acid in an aqueous solution than borax (Na borate, $10H_2O$ or $NA_2B_4O_7 \cdot 10H_2O$).

It has been discovered that, by selecting 119 the ratio of the two components, in a narrow range, and by selecting the phosphonic derivative from an equally restricted family, the two properties mentioned above are surprisingly obtained simultaneously and very distinctly, namely:

a very long setting time, at the time of circulation, even at high temperatures, making it possible to cement deep, geothermal and analogous wells with the vital security margin (precluding any risk of premature setting inside the tubing, or "flash set"), and very swift compressive strength development, up to high values, when the slurry has been placed, thus guaranteeing cementing quality and considerably shortening the time for which the well is unproductive, which is a very important economic factor.

This is also a security factor when planning cementing operations as the slurry can be over-retarded to rule out any risk of premature setting during placement.

As mentioned earlier, the selection according to the invention concerns the choice of phosphonic compound.

The particularly preferred phosphonic compounds according to the invention are:

the compound referenced "E" on page 3 of the GB patent 2 157 279 aforementioned, namely the calcium salt of phosphonic ethylenediamine-N,N,N',N'-tetrakis (methylene) acid with seven calcium equivalents (3.5 moles);

the compound referenced "D" in the same document, namely the heptasodic salt of the same phosphonic derivative;

A skilled artisan will be able to select the phosphonic compounds that are useful according to the invention, in the light of his own knowledge and The borates usable according to the invention, and which thus have to be at least as acid or more acid in an aqueous solution than borax ($NA_2B_4O_7.10H_2O$), can be chosen from a large family.

Preferably, the following will be used:

acid itself, sodium pentaborate, potassium pentaborate and the equivalent compounds, which will easily occur to a skilled artisan.

Quite especial preference will be given to sodium pentaborate.

In addition, it would seem to us, without wishing to be tied down to a theory, that the selection according to the invention is accompanied by a reversal of the functions.

In the prior art, the phosphonic derivative is the retarder, and the borax or the borate is simply an adjuvant or retarder aid.

According to the invention, the borax is the main retarder, while the phosphonic derivative plays the part of an aid, with a synergy that provides the dual property mentioned earlier.

Another essential parameter in selection according to the invention lies in the choice of the ratio by weight of phosphonic derivative to borate, which has to be as specified hereinafter.

The preferred ratio of phosphonic derivative to borate type compound, in particular sodium pentaborate, is 0.05 to 0.12 parts by weight for 0.95 to 0.88 parts by weight, and in particular, 0.08 parts by weight of phosphonate for 0.92 parts by weight of sodium pentaborate.

As to the boric acid, the preferred ratio also varies between 0.95 and 0.88 parts by weight of boric acid for 0.05 to 0.12 parts by weight of phosphonic derivative.

As to the borax, the preferred ratio varies between 0.97 and 0.92 (parts by weight of borax), for 0.03 and 0.08 parts by weight of phosphonic derivative.

The present invention makes it possible to cement high temperature wells (at typically 110° to 260° C., i.e. 230° to 500° F. in the case of the static temperature at the well bottom), with a long pumping time that is made possible with complete security thanks to a thickening time (TT) of over 7 hours at the BHCT, and with swift compressive strength development after placement, reaching 35 kg/cm2 (500 psi) in less than 24 hours at the BHCT less 30° F. (i.e. BHCT less approximately 17° C.).

The retarding composition (phosphonic derivative +borate) will be present in a proportion of 0.5 to 3% by weight of cement ("BWOC").

Phosphonic derivatives E and D, as well, of course, as the borates, in particular sodium pentaborate, are commercially available.

The following examples illustrate the invention without, however, limiting its scope.

In these examples, the abbreviations have the following meanings:

% BWOC: % by weight of cement

TT: thickening time

CS: compressive strength

BHCT: bottom hole circulation temperature

Ph: phosphonic acid derivative "E" or "D", as indicated in the tables

B: borate

BHST: bottom hole static temperature

Retarding mixture: Ph+B

ST: static temperature (measurement of CS)

BWOW: by weight of water

The CS measurements were conducted using a Halliburton ultrasonic analyser ("UCA"). This is a non-API (American Petroleum Institude) technique, but one that enables the 35 kg/cm2 (500 psi) threshold to be passed.

The slurries were prepared according to the API standard.

The tests were then conducted by heating.

Compressive strength was measured as indicated above.

In the following examples, approximately 0.30 to 0.7 parts by weight of water were used per part by weight of dry cement, in order to obtain pumpable slurries. The invention does not place any obstacles in the way of the use of the additives well known to a man of the art, such as, for example, filtrate control agents, dispersants, anti-settling agents, weighting agents, diluents (or "extenders"), silica or micro-silica and analogous additives.

EXAMPLE 1

Cement slurry compositions containing different quantities of retarder were prepared by mixing a class "H" cement according to the API standard with 35% of silica powder by weight of dry cement, 50% of water BWOC, a conventional dispersant in a ratio of 18 1/t (0.2 gal/sk); an anti-foaming agent and a filtrate control agent, also conventional, and a retarder as indicated in Table I hereinafter. The thickening time tests were conducted at a BHCT of 204° C. (400° F.), at a bottom hole pressure of 152 MPa (22 000 psi) and allowing for a time of 75 minutes to reach bottom hole conditions, according to Annex 11G7 of the API standards.

The results, grouped together in Table I, confirm that the borates developing higher acidity than borax lead to a far longer thickening time than borax.

It should also be noted that, in test No. 4, metaborate (which is more basic than borax) leads to quick setting, in 80 minutes, that is to say more or less the time when the slurry has just reached the well bottom, which is unacceptable.

Table II hereinafter gives the compressive strength development times for different retarder compositions.

EXAMPLE 2

The slurries were prepared as in example I, with the retarders indicated in Table III below. Sodium pentaborate was specially studied. Thickening time measurements were carried out as in example I. The compressive strength (CS) characteristics were grouped together in Table IV below for the same slurries, at the test temperature specified in the Table.

These two tables confirm that, for the proportions indicated in the description, we obtain both a long retardation of thickening swift compressive strength development.

Thus, the comparative formulations of tests 3 and 5 do not lead to sufficiently swift compressive strength development.

EXAMPLE 3

Cement slurries were prepared as in examples 1 and 2. The thickening time and compressive strength results are grouped together in Tables V and VI.

Procedure was as before, except in that the TT measurement temperature was 149° C. (300° F.).

These tables confirm the great value of sodium pentaborate, in the proportions indicated in the description, for the purpose of obtaining the unique combination of a very long thickening time (in the order of 7 hours) and swift compressive strength development, both at 300 and 400° F.

TABLE I

| Slurry No. | Retarder (1) | Ratio of component in parts by weight | Retarder concentration (% BWOC) | TT (100 BC) h h:mn |
|---|---|---|---|---|
| 1 | Borax - Ph (salt) | 9.5–0.5 | 2.8 | 5:40 |
| 2 | Na-pentaborate-Ph (salt | 8.9–1.1 | 1.43 | 7:30 |
| 3 | Boric acid-Ph (salt | 9.5–0.5 | 1.35 | 17:50 |
| 4 | Na-metaborate tetrahydrate-Ph (Salt) | 9.5–0.5 | 2.99 | 1:20 |
| 5 | K-pentaborate - Ph (salt) | 8.9–1.1 | 1.43 | 13:04 |

(1): additive type "E"

TABLE II

| Slurry No. | Retarder (1) | Ratio of components in parts by weight | Retarder concentration (% BWOC) | TT h:min | CS psi | CS h:min | CS MPa |
|---|---|---|---|---|---|---|---|
| 1 | Borax - Ph (salt) | 9.5–0.5 | 2.8 | 5:40 | 350° F. | | |
| | | | | | 50 | 11:11 | |
| | | | | | 500 | 13:13 | |
| 2 | Borax - Ph (Salt) | 9.5–0.5 | 2.9 | 5:38 | 370° F. | | |
| | | | | | 6400 | 24:00 | 44.1 |
| 3 | Boric acid-Ph (salt) | 9.5–0.5 | 1.35 | 17:50 | 370° F. | | |
| | | | | | 50 | 17:50 | |
| | | | | | 500 | 20:45 | |
| 4 | Na-pentaborate-Ph (salt) | 9.2–0.8 | 1.65 | 9:45 | 370° F. | | |
| | | | | | 50 | 14:60 | |
| | | | | | 500 | 16:64 | |
| | | | | | 1954 | 27:20 | 13.46 |

(1) additive type "E"

TABLE III

| Slurry No. | Retarder (2) | Ratio of component in parts by weight | Retarder concentration (% BWOC) | TT (100 BC) h:mn |
|---|---|---|---|---|
| 1 | Na-pentaborate-Ph (salt) | 9.2–0.8 | 1.65 | 9:45 |
| 2 | Na-pentaborate-Ph (salt) | 9.45–0.55 | 1.52 | 5:00 |
| 3 | Na-pentaborate-Ph (salt) | 9.71–0.29 | 1.65 | 4:38 |
| 4 | Borax - Ph (Salt) | 9.5–0.5 | 3.00 | 14:47 |
| 5 | Na-pentaborate - Ph (salt) | 8.46–1.54 | 1.65 | 4:16 |

(2): additive type "D"

TABLE IV

| Slurry No. | Retarder (2) | Ratio of components in parts by weight | Retarder concentration (% BWOC) | CS psi | CS h:min | CS MPa |
|---|---|---|---|---|---|---|
| 1 | Na-pentaborate-Ph (salt) | 9.2–0.8 | 1.65 | 370° F. | | |
| | | | | 50 | 14:60 | |
| | | | | 500 | 16:54 | |
| | | | | 1954 | 27:20 | 13.46 |
| 2 | Na-pentaborate-Ph (Salt) | 9.45–0.55 | 1.52 | 370° F. | | |
| | | | | 50 | 11:50 | |
| | | | | 500 | 13:58 | |
| | | | | 3434 | 28:21 | 23.7 |
| 3 | Na-pentaborate-Ph (salt) | 9.71–0.29 | 1.65 | 370° F. after | No 70 h | setting |
| 4 | Borax - Ph (Salt) | 9.5–0.5 | 3.00 | 400° F. | | |
| | | | | 50 | 6:26 | |
| | | | | 500 | 6:45 | |
| | | | | 3150 | 36:00 | 21.7 |
| 5 | Na-pentaborate-Ph (salt) | 8.46–1.54 | 1.65 | 370° F. after | No 70 h | setting |

(s) additive type "D"

TABLE V

| Slurry No. | Retarder (2) | Ratio of component in parts by weight | Retarder concentration (% BWOC) | TT (100 BC) h:mn |
| --- | --- | --- | --- | --- |
| 1 | Na-pentaborate-Ph (salt) | 9.2–0.8 | 1.00 | 6:05 |
| 2 | Na-pentaborate-Ph (salt) | 8.8–1.2 | 1.13 | 9:20 |
| 3 | Na-pentaborate-Ph (salt) | 9.45–0.55 | 1.13 | 7:00 |
| 4 | Na-pentaborate-Ph (Salt) | 9.5–0.5 | 1.00 | 5:15 |
| 5 | Borax - Ph (salt) | 9.5–0.5 | 1.30 | 3:26 |

(2) additve type "D"

TABLE VI

| Slurry No. | Temperature °C. °F. | psi | CS h:min | MPa |
| --- | --- | --- | --- | --- |
| 1 | 270 | 50 | 14:44 | |
|   |     | 500 | 18:08 | |
|   |     | 2298 | 40:55 | 15.83 |
| 2 | 270 | 50 | 20:04 | |
|   |     | 500 | 25:28 | |
|   |     | 2005 | 40:51 | 13.81 |
| 3 | 270 | 50 | 17:44 | |
|   |     | 500 | 22:42 | |
|   |     | 3062 | 66:58 | 21.1 |
| 4 | 270 | 50 | 11:29 | |
|   |     | 500 | 14:26 | |
|   |     | 4219 | 42:24 | 29.1 |
| 5 | 270 | 4900 | 24:00 | 33.76 |

We claim:

1. A retarder for a cement slurry consisting essentially of 0.05 to 0.12 parts by weight of the retarder of a methylene phosphonic acid derivative and from 0.95 to 0.88 parts by weight of the retarder of a borate which is at least as acidic as borax.

2. The retarder as set forth in claim 1 wherein the borate is selected from a group consisting of boric acid, sodium pentaborate and potassium pentaborate.

3. The retarder as set forth in claim 2 wherein the borate is sodium pentaborate.

4. The retarder as set forth in claim 1 wherein the methylene phosphonic acid derivative is selected from a group consisting of the calcium salt of ethylenediamine-N,N,N',N'-tetrakis (methylene) phosphonic acid having 3.5 moles of calcium and the heptasodic salt of ethylenediamine-N,N,N',N'-tetrakis (methylene) phosphonic acid.

5. The retarder as set forth in claim 1 comprising 0.92 parts by weight sodium pentaborate and 0.08 parts by weight methylene phosphonic acid derivative.

6. The retarder as set forth in claim 5 wherein the methylene phosphonic acid derivative is the calcium salt of ethylenediamine-N,N,N',N'-tetrakis (methylene) phosphonic acid having 3.5 moles of calcium.

7. The retarder as set forth in claim 1 consisting essentially of 0.92 parts by weight boric acid and 0.08 parts by weight of the calcium salt of ethylenediamine-N,N,N',N'-tetrakis (methylene) phosphonic acid having 3.5 moles of calcium.

* * * * *